(12) United States Patent
Zhou

(10) Patent No.: US 7,840,854 B2
(45) Date of Patent: Nov. 23, 2010

(54) APPARATUS AND ASSOCIATED METHODS FOR DIAGNOSING CONFIGURATION FAULTS

(75) Inventor: Dong Zhou, San Jose, CA (US)

(73) Assignee: NTT Docomo, Inc., Tokyo (JP)

( * ) Notice: Subject to any disclaimer, the term of this patent is extended or adjusted under 35 U.S.C. 154(b) by 449 days.

(21) Appl. No.: 11/871,064

(22) Filed: Oct. 11, 2007

(65) Prior Publication Data

US 2008/0133971 A1    Jun. 5, 2008

Related U.S. Application Data

(60) Provisional application No. 60/872,085, filed on Dec. 1, 2006.

(51) Int. Cl.
*G06F 11/00* (2006.01)
(52) U.S. Cl. .......................................... 714/47; 714/33
(58) Field of Classification Search .................. 714/32, 714/33, 37, 38, 39, 47; 717/124, 128, 121, 717/135
See application file for complete search history.

(56) References Cited

U.S. PATENT DOCUMENTS

| 7,051,243 | B2 | 5/2006 | Helgren et al. | |
|---|---|---|---|---|
| 7,127,506 | B1 * | 10/2006 | Schmidt et al. | 709/224 |
| 7,305,466 | B1 * | 12/2007 | Kaffine et al. | 709/224 |
| 2004/0260678 | A1 * | 12/2004 | Verbowski et al. | 707/3 |
| 2005/0188268 | A1 * | 8/2005 | Verbowski et al. | 714/37 |
| 2006/0025962 | A1 * | 2/2006 | Ma et al. | 702/182 |
| 2006/0195750 | A1 | 8/2006 | Deshmukh et al. | |

OTHER PUBLICATIONS

Ganapathi, A., et al., "Why PCs are fragile and what we can do about it: a study of windows registry problems", Dependable Systems and Networks, 2004 International Conference, Jun. 28, 2004, pp. 522-527, XP010710861, IEEE, Piscataway, NJ, USA.

PCT International Preliminary Report on Patentability dated Jun. 11, 2009, 8 pages.

Jiahe Helen Wang, John C. Platt, Yu Chen, Ruyun Zhang and Yi-Min Wang, Automatic Misconfiguration Troubleshooting with PeerPressure. In Proceedings of the $6^{th}$ Symposium on Operating System Design and Implementation. (OSDI 2004) Aug. 2005.

Andrew Whitaker, Richard S. Cox and Steven D. Gribble, Configuration Debugging as Search: Finding the Needle in the Haystack. In Proceedings of the $6^{th}$ Symposium on Operating System Design and Implementation. (OSDI 2004). Feb. 2004.

Microsoft Corp. FileMon for Windows. http://www.microsoft.com/technet/sysinternals/utilities/filemon.mspx.

Microsoft Corp. RegMon for Windows. http://www.microsoft.com/technet/sysinternals/utilities/regmon.mspx.

* cited by examiner

*Primary Examiner*—Dieu-Minh Le
(74) *Attorney, Agent, or Firm*—Blakely, Sokoloff, Taylor & Zafman LLP

(57) ABSTRACT

A method and apparatus is disclosed herein for diagnosing configuration faults. In one embodiment, the method comprises: detecting a violation to one or more dynamically constructed invariants for configuration; and diagnosing a misconfiguration based on use of a task-based ranking of misconfiguration suspect causes in which suspect causes of the misconfiguration are ranked based on information indicative of which entity made a change related to the one or more invariants for which a violation was detected.

24 Claims, 10 Drawing Sheets

# APPARATUS AND ASSOCIATED METHODS FOR DIAGNOSING CONFIGURATION FAULTS

PRIORITY

The present patent application claims priority to and incorporates by reference the corresponding provisional patent application Ser. No. 60/872,085, titled, "Apparatus and Associated Methods for Diagnosing Configuration Faults," filed on Dec. 1, 2006.

FIELD OF THE INVENTION

Embodiments of the present invention relate to diagnosing software faults caused by misconfiguration; more specifically, the present invention relates to using task-based ranking of suspected causes of the misconfigurations, where suspected tasks are established by monitoring violations to configuration invariants.

BACKGROUND OF THE INVENTION

The dependability of mobile devices is directly linked to the maintenance cost of such devices. An unreliable device (e.g., one with exceptionally large amount of bugs in its software stack) may result in expensive costs to device service operators in customer service calls and/or device recalls.

A major cause of dependability concern on mobile devices is in device management (DM) operations conducted on such device. DM operations include operations to install/remove applications/libraries, update applications/libraries, as well as changing system and application settings.

Typically, at the time just after the user purchased the mobile device, the device is considered quite dependable as the device model had typically gone through rigorous testing/tuning by the device manufacturer, the software developers, and/or the service operator. Thus, as long as the user uses the device in a way expected by manufacturers and software developers, and not change the device to a state not anticipated by manufacturers and software developers, the software on the device should likely continue to function reliably.

However, as the user starts to conduct more and more DM operations, the state of the device deviates further and further from expected/normal states. Such deviated states may make the device unreliable and increase device maintenance costs for the operator. The risk of a device ending into problematic states is increasing with the user having more freedom to conduct DM operations (such as downloading and installing suspicious native applications) and with the software stack on the device becoming more and more complex.

Users of open computing platforms are more likely to find themselves in situations like "The application just crashed! But yester it was fine!", or "why this game runs great on his device but doesn't work on mine?!" In open computing platforms, users can extensively change the configurations of the hardware and software, including introducing new hardware and software into the platforms. Increasingly, personal computing systems are becoming open computing platforms, including the majority of PCs, as well as an increasing number of mobile devices, such as PDSs and cell phones.

The above described frustrating dependability related scenarios are more likely to happen on open computing platforms because such platforms are more suspicious to problematic configuration changes. For example, assigning wrong value to a configuration item (such as a port number) may cause problem for software that uses the configuration items.

As another example, updating a library during the course of installing a new application may break old applications that depend on the library, if the new version of the library is not backward compatible.

Traditional approaches for diagnosing and solving such configuration problems involves first describing the symptoms of the problem, then from a problem database, matching described symptoms with a number of records, and matching described symptoms with a number of records, and finally, for each record, if the record indicates that the cause of the problem is a configuration item, then try to set the configuration item with suggested value. The process involves a large amount of human involvement, and taxes heavy cost for companies providing such customer services.

To reduce human involvement and other costs in the process, researchers have looked at approaches for automatically generating a list of suspected problematic configurations, approaches for ranking such suspects, and approaches for automatically recovering from misconfiguration. Such existing efforts typically use the information that the value of a configuration item was changed to identify suspect configuration items. A limitation of such a binary approach (i.e., the value was changes or not) is that, when the number of items that has changed is big, it is difficult to nail down the misconfigurated items(s).

The use of correctness constraints on configuration classes has been proposed. A configuration class is defined as a group of Windows hierarchical registry keys with the same structure. A registry key violating any of the constraints of its configuration class is considered as possible misconfiguration. Four types of constraints are used: size constraint, which says that a subkey in a given configuration class has a fixed size; value constraint, which says that the value of a subkey in a given configuration class takes on one of a small set values; reference constraints, which says that a registry key should always reference instance of a particular configuration class; and equality constraint, which says that a group of registry keys should always have the same value.

SUMMARY OF THE INVENTION

A method and apparatus is disclosed herein for diagnosing configuration faults. In one embodiment, the method comprises: detecting a violation to one or more dynamically constructed invariants for configuration; and diagnosing a misconfiguration based on use of a task-based ranking of misconfiguration suspect causes in which suspect causes of the misconfiguration are ranked based on information indicative of which entity made a change related to the one or more invariants for which a violation was detected.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
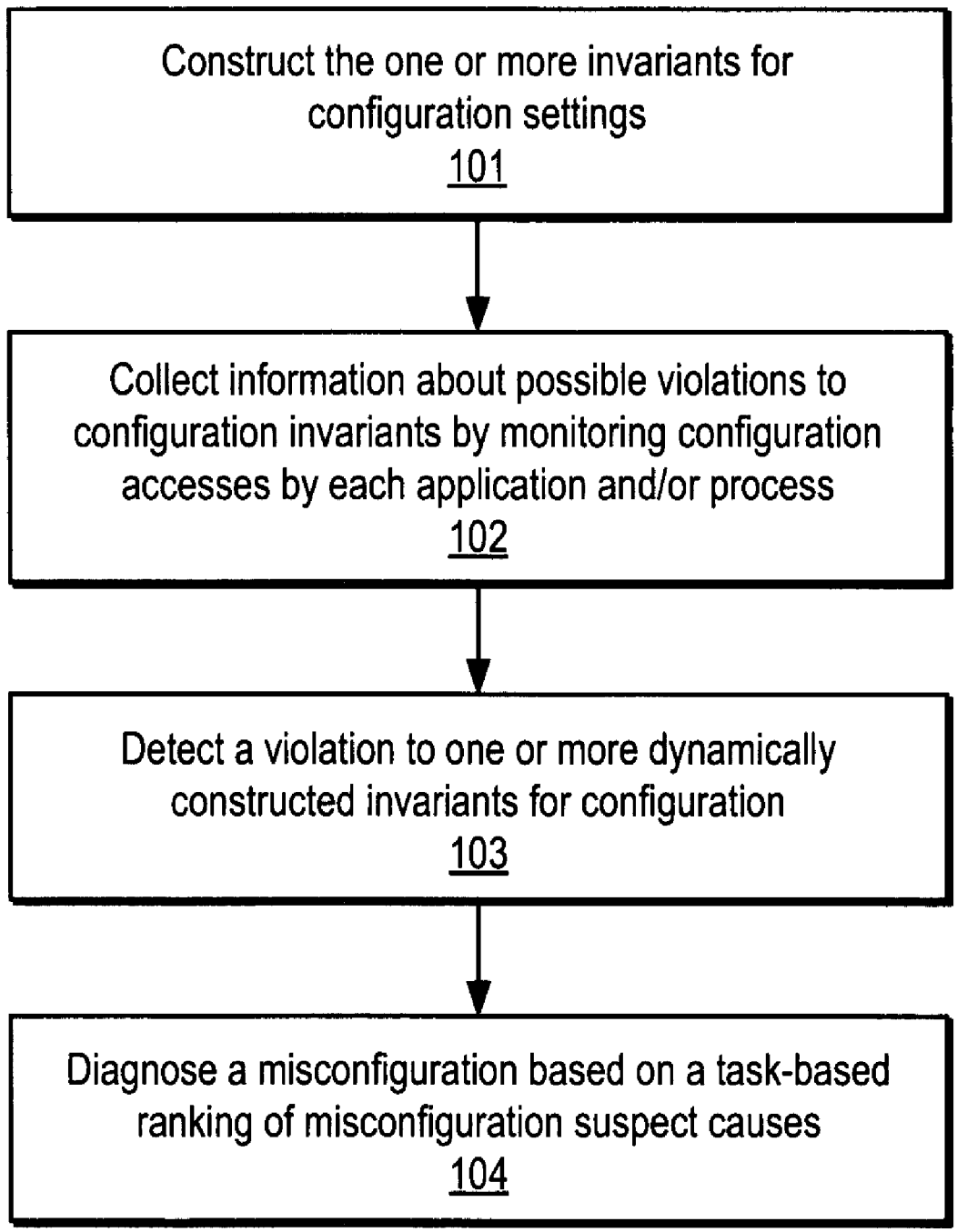
FIG. 1 is a flow diagram of one embodiment of a process for diagnosing configuration faults.

Apparatuses and methods for diagnosing software faults caused by misconfigurations are disclosed. Examples of such misconfiguration include, but not limited to, library version mismatches, wrong server addresses, or results from any changes to system settings made by unreliable or malicious software.

In one embodiment, the apparatus has three interfaces: a configuration access notification interface (CANI) for accepting information about configuration accesses made by applications or tasks; a task success notification interface (TSNI) for accepting notifications about the successful completion of a task or application; and a fault diagnosis request interface (FDRI) for accepting requests for diagnosing faults caused by misconfiguration and for returning a ranked collection of configurations that may have caused the fault. In one embodiment, notification messages accepted through CANI include notification of application accesses to configuration file(s). Write access information contained in such messages are stored in persistent storage for later reference. Task success notification messages received through TSNI are used to trigger the refinement of invariants on configuration items accessed by the successful task. A fault diagnosis request message received through FDRI triggers the apparatus to check for violations to invariants in configuration settings, to rank tasks that caused violation in configuration invariants by their probabilities of being the cause of the failed task, and to return the ranked collection of violating tasks and their write accesses to configuration settings.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

An apparatus and associated techniques for diagnosing configuration faults are described. In one embodiment, these techniques rely on the monitoring of accesses to configurations by tasks.

For purposes herein, configurations include one or more of system settings, environment settings, and application settings. Examples of system settings include, but are not limited to, operating system (OS), library, virtual machine, device driver versions, system parameters (e.g., DNS server, blocked network ports, environment variables, etc.), etc. Environment settings include, but are not limited to, availability information corresponding to resources such as, for example, persistent and volatile memory, concurrently running applications and system services, files locked, network connectivity, etc.

Examples of application settings include, but are not limited to, application version, application configurations stored in registry or configuration file, etc.

Also for purposes herein, tasks refer to the execution of applications or system services (e.g., a network management utility). In one embodiment, read and write accesses to configuration items by tasks are monitored through, for instance, file system and registry monitors such as FileMon and RegMon, available from Microsoft Corp. of Redmond, Wash.

For purposes herein an invariant is a set of properties describing the value of a program variable for the values of a set of variables.

FIG. 1 is a flow diagram of one embodiment of a process for diagnosing configuration faults. The process is performed by processing logic that may comprise hardware (circuitry, dedicated logic, etc.), software (such as is run on a general purpose computer system or a dedicated machine), or a combination of both.

Referring to FIG. 1, the process begins by processing logic dynamically constructing the one or more invariants for configuration settings (processing block 101). Afterwards, processing logic collects information about possible violations to configuration invariants by monitoring configuration accesses by each application and/or process (processing block 102). Next, processing logic detects a violation to one or more dynamically constructed invariants for configuration (processing block 103). After a violation has been detected, processing logic diagnoses a misconfiguration based on a task-based ranking of misconfiguration suspect causes (processing block 104). In one embodiment, the suspect causes of the misconfiguration are ranked based on information indicative of which entity (e.g., application, processes, etc.) made a change related to the one or more invariants for which a violation was detected.

In one embodiment, processing logic diagnoses a misconfiguration based on a task-based ranking of misconfiguration suspect causes by generating a list of suspect tasks that made write operations to configuration items and violated invariants for each task that failed in the list of tasks, ranking tasks in the list of suspect tasks, and generating a list of ranked suspect tasks with information about write accesses to configuration items performed by tasks in the list of ranked suspect tasks. In one embodiment, the tasks are ranked based on trustworthiness indications and root cause probabilities indicative of whether their violation of configuration invariants is a root cause for the failed task. In one embodiment, the trustworthiness indication of a task is based on one or more of the following: a location of a binary executable or script of the task, a source of the binary executable or script, an indication of whether the binary executable or script has a certificate, and a number of times the binary executable or script has been executed. In one embodiment, the root cause probability of a configuration item is calculated based on one or more of the following: a number of other tasks accessing the configuration item, a number of tasks that occurred after the configuration item was last undergone a write access, a number of times a current value of the configuration item was assigned to the configuration item, and a number of write accesses to the configuration item made by the task being ranked over a total number of write accesses.

Interfaces

In one embodiment, the diagnosis framework disclosed herein has three external interfaces. These interfaces receive notifications.

In one embodiment, notifications for accesses to configuration items by each task are taken as inputs. Information about write operations to configuration items is logged and stored in persistent storage of the computing device.

In one embodiment, notifications of the successful completion of each task are taken as inputs. Upon receiving such a notification, an invariant is initialized (if it is the successful completion of the task) or refined for each configuration item on which the task performed a read operation.

In one embodiment, a fault diagnosis request message is received as an input. Upon receiving the fault diagnosis request message, checks for violations to invariants of configuration items read-accessed by the failed task are made, the tasks that made write operations that violated invariants are identified, such tasks are ranked by the likelihood of being the root cause for the failed task, and the ranked list of tasks is output.

Figure 2:
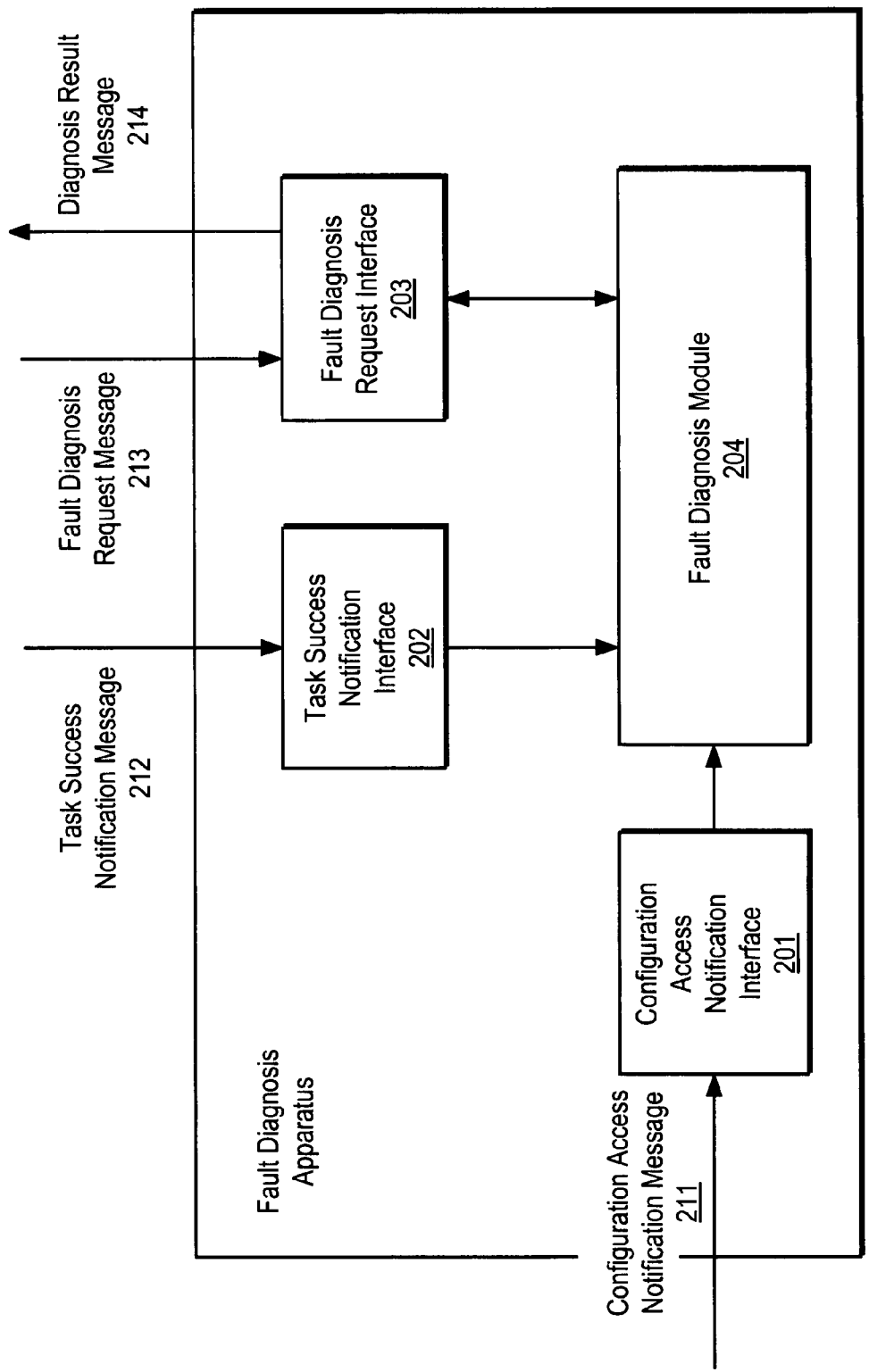
FIG. 2 is a block diagram of a fault diagnosis apparatus.

FIG. 2 is a block diagram of one embodiment of a fault diagnosis apparatus. Each of the blocks comprises processing logic that may comprise hardware (circuitry, dedicated logic, etc.), software (such as is run on a general purpose computer system or a dedicated machine), or a combination of both.

Referring to FIG. 2, the apparatus has three interfaces: a Configuration Access Notification Interface (CANI) 201, a Task Success Notification Interface (TSNI) 202, and a Fault Diagnosis Request Interface (FDRI) 203.

CANI 201 receives configuration access notification messages 211 from external modules. Messages can be passed using any inter-procedural means, such as, for example, a shared memory, sockets, remote procedure call, or an event/message/notification system. An example of such external module is FileMon or RegMon. In one embodiment, each configuration access notification message 211 contains following information: the identification (ID) of the task, the time of the access, a list containing one or more items, each describing the name of the configuration item, the type of access (read or write), and, for write access, the new value of the configuration item. In one embodiment, the identification of the task is the full name of the executable binary or script file of the task. CANI 201 passes such messages to fault diagnosis module (FDM) 204.

TSNI 202 receives task success notification messages 212 from external modules. An example of such an external module is a tool that monitors program exist status and detects program crash or hanging. In one embodiment, each task success notification message 212 at least contains the identification (ID) of the successful task and the time that such success was observed. TSNI 202 passes such messages to FDM 204.

FDRI 203 receives fault diagnosis request messages 213 from external modules. An example of such an external module is a tool that monitors program exist status and detects program crash or hanging. In one embodiment, each fault diagnosis request message 213 contains at least the identification (ID) of the failed task and the time such failure was observed. FDRI 203 passes such messages to FDM 204, receives a fault diagnosis result message 214 from FDM, and forwards such result to an external module. In one embodiment, each fault diagnosis result 214 message contains at least an ordered list elements, each containing at least following information: the identification of a suspected task that violated configuration invariants and a number indicating the probability or likelihood of this task being the root cause for the failed task. Other fields that may be included in each fault diagnosis result message include fields indicating the time the first of such violations happened and the time the last of such violations occurred, as well as, a list containing information for each configuration item to which the suspected task made a write accesses. In one embodiment, this information including the name of the item, the invariant for the item, and the new value as a result of the write access.

One Embodiment of the Fault Diagnosis Module

Figure 3:
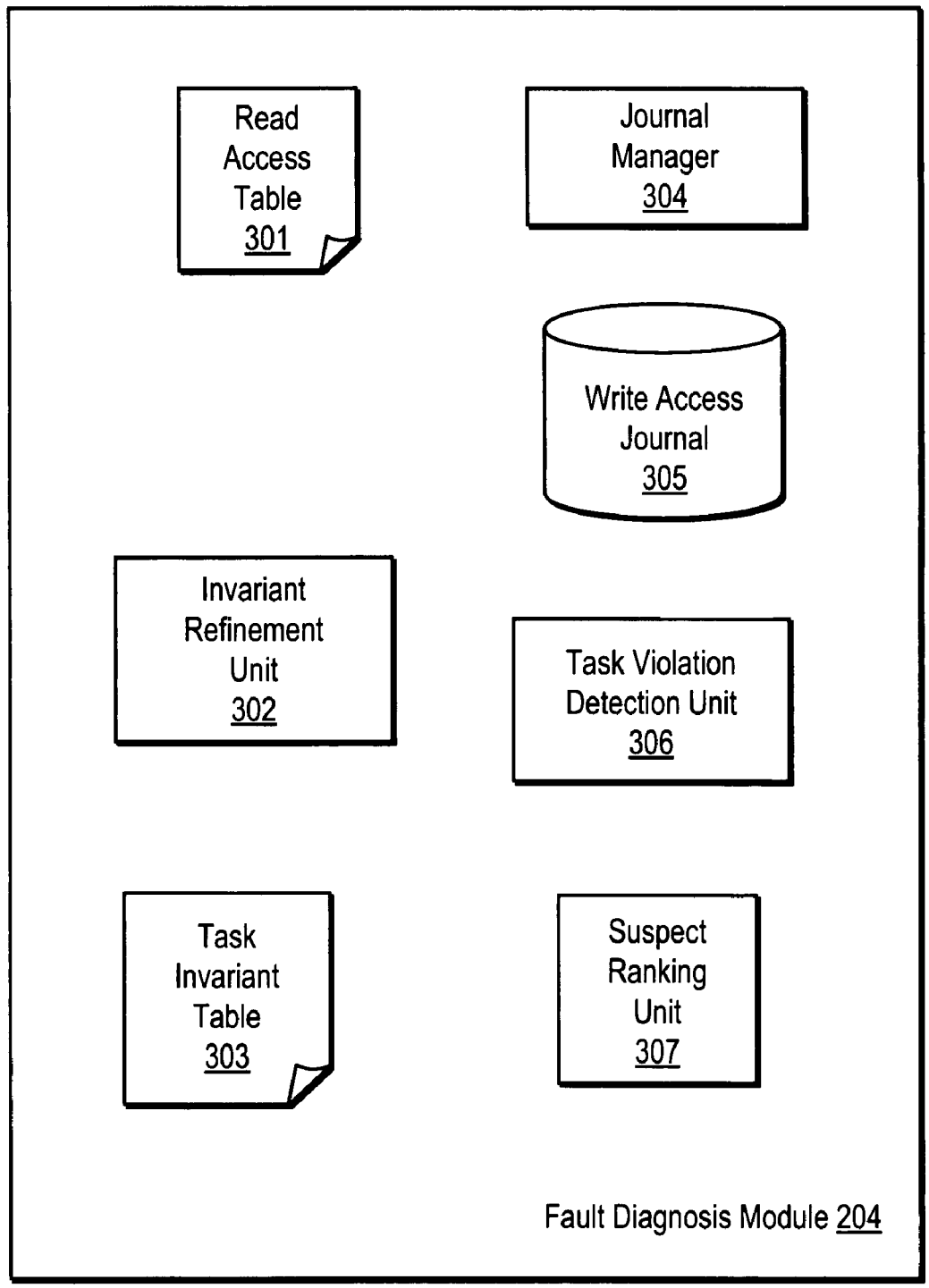
FIG. 3 is a block diagram of one embodiment of a fault diagnosis module (FDM)

FIG. 3 is a block diagram of one embodiment of fault diagnosis module (FDM) 204. Each of the components comprises processing logic that may comprise hardware (circuitry, dedicated logic, etc.), software (such as is run on a general purpose computer system or a dedicated machine), or a combination of both.

Referring to FIG. 3, the FDM 204 comprises a read access table 301, a write access journal (storage) 305, a write journal manager 304, a task invariant table (storage) 303, an invariant refinement unit 302, a task violation detection unit 306, and a suspect ranking unit 307.

In one embodiment, read access table 301 is a storage having one entry for each task, and each entry stores at least the following information: the identification of the task, a list of elements where each element has fields including the identification of the configuration item read, the time the read access occurred, and the value of the configuration item when the read access occurred. Note that in one embodiment, once a task success notification message 212 or a fault diagnosis request message 213 for a task has been processed, the task's entry in read access table 301 can be removed.

Write access journal 305 is a storage log of write accesses to configuration items by tasks. In one embodiment, each entry in the log contains at least following information: the identification of the configuration item, the identification of the task that made the write access, the time the write access occurred, and the new value of the configuration item.

Write journal manager 304 is responsible for maintaining write access journal 305. Write journal message 304 adds new write access information, keeps journal 305 on persistent storage, and periodically removes old entries from journal 304 when they become useless.

Figure 4:
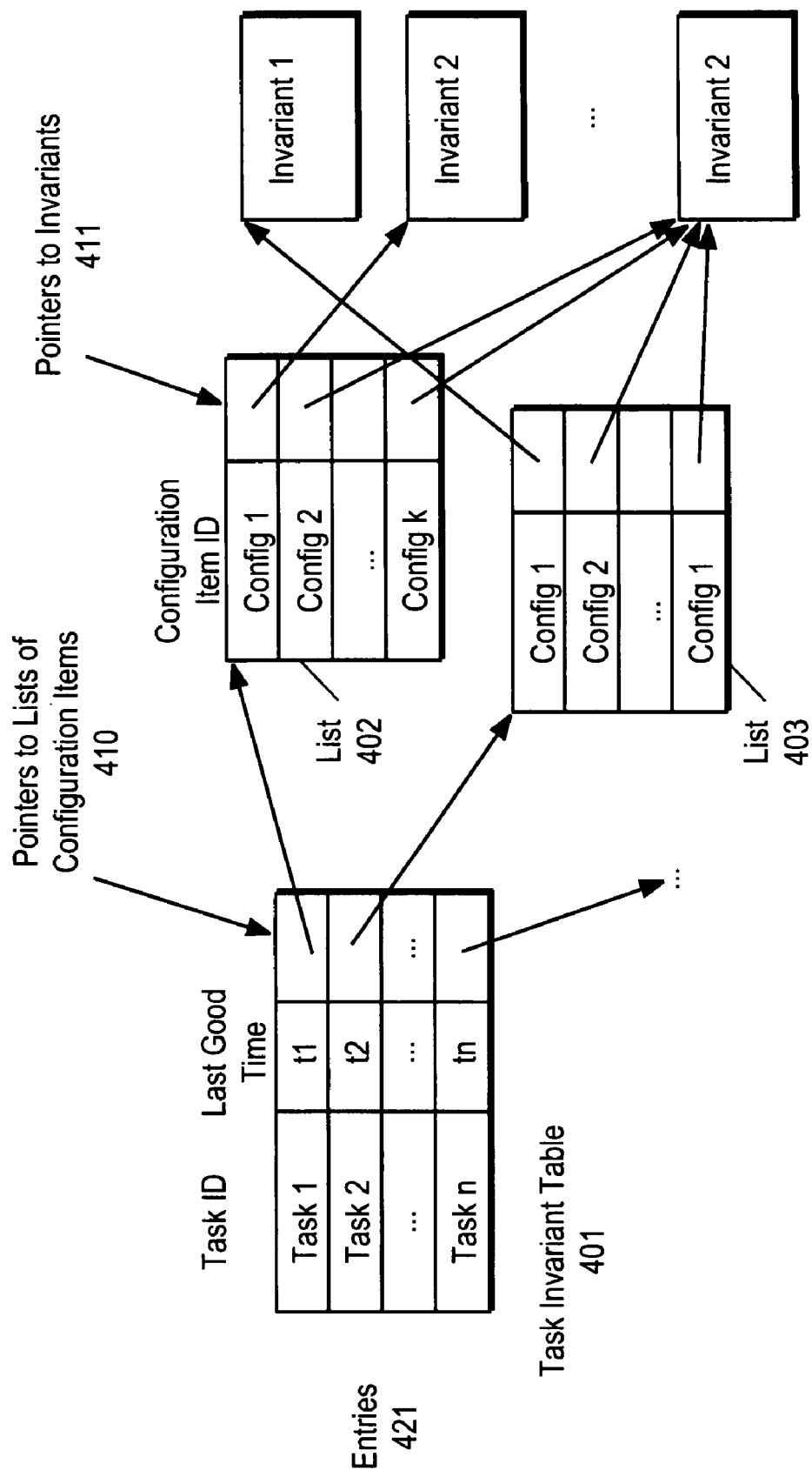
FIG. 4 depicts the structure of one embodiment of a task invariant table.

In one embodiment, task invariant table 303 has one entry for each task, where each entry contains the identification of the task and a pointer to a list of configuration accesses of the task. In one embodiment, each element in the list contains the identification of the configuration item, as well as a pointer to an invariant. Note that multiple elements from one or more lists can point to the same invariant. FIG. 4 depicts the structure of one embodiment of task invariant table 303. Referring to FIG. 4, task invariant table 401 contains a number of entries 421, with each of entries 421 including one of tasks 1-n, one of last time an access occurred by the task when the configuration item was still good, and one of pointers 410. Each of pointers 410 point to a list, such as lists 402 and 403. Each of lists 402 and 403 includes one or more entries, with each entry containing the ID of a configuration items and a pointer 411 to an invariant.

Referring back to FIG. 3, invariant refinement unit 302 redefines an invariant for a configuration item accessed by a task with a new value. In one embodiment, invariant refinement unit 302 first checks if the new value violates the invariant, and if it does, invariant refinement unit 302 redefines the invariant with the new value taken into consideration.

Task violation detection unit 306 is responsible for determining the list of tasks that made write operations to configuration items and violated invariants for the failed task.

Suspect ranking unit 306 gets the list of suspect tasks from task violation detection unit 306, ranks these tasks using an algorithm described below, and returns this ranked suspect task list with information about their write accesses to configuration items.

In one embodiment, there are three types of basic invariants: integer number invariants, real number invariants, and string invariants. Below is one embodiment of the integer number invariant implemented in the C programming language:

```
typedef struct {
    int refineCount;
    char isConstant;
    char monotonic;
    ExpandableList *valueSet;
    int lowerBound, upperBound;
    int constBits;
} NumberInvariant;
```

The refineCount field is for recording the total number of refinements conducted on the invariant. The isConstant field is used to indicate whether the number value of the configuration item is constant. The monotonic field is used to indicate whether the number value of the configuration item increases or decreases monotonically. The valueSet field, if it is not set to null, contains all the previously assigned values of the configuration item. The lowerBound and upperBound fields indicate the lower bound and upper bound of the number value of the configuration item, respectively. The constBis field indicates the bits in the new value that should remain the same as in the same bits in the old value. A real number invariant is implemented similarly to an integer number invariant.

An embodiment of a string invariant implemented in the C programming language is given below:

```
typedef struct {
    int refineCount;
    char nullFlag;
    int minLength, maxLength;
    char *prefix, *suffix;
    char *substring;
} StringInvariant;
```

Again, the refineCount field is for recording the total number of refinements conducted on the invariant. The nullFlag field indicates whether null value is allowed for the configuration item. The minLength and maxLength fields indicate the minimum and maximum number of characters in the value string of the configuration item. The prefix field, if not set to null, indicates the prefix of the value string. Similarly, the suffix field, when not set to null, indicates the suffix of the value string. Again, the substring field, when not set to null, specifies a substring must be contained in the value.

In one embodiment, for configuration items defined through configuration files: for each line in the configuration file, if the line contains a separator sequence in the middle of the line, then the line is considered to contain a configuration item. A separator sequence is a configurable string containing one or more characters. A sample separator sequence is " " or "=". In one embodiment, characters before the first separator sequence in the line is considered as the name of the configuration item, while those after the first separator sequence is considered as the value of the configuration item. In one embodiment, a file is considered as one of the configuration files of a task if the file is a text file (rather than a binary file), the file is accessed during the initialization phase of the task, and the size of the file is under a customizable threshold.

Figure 5:
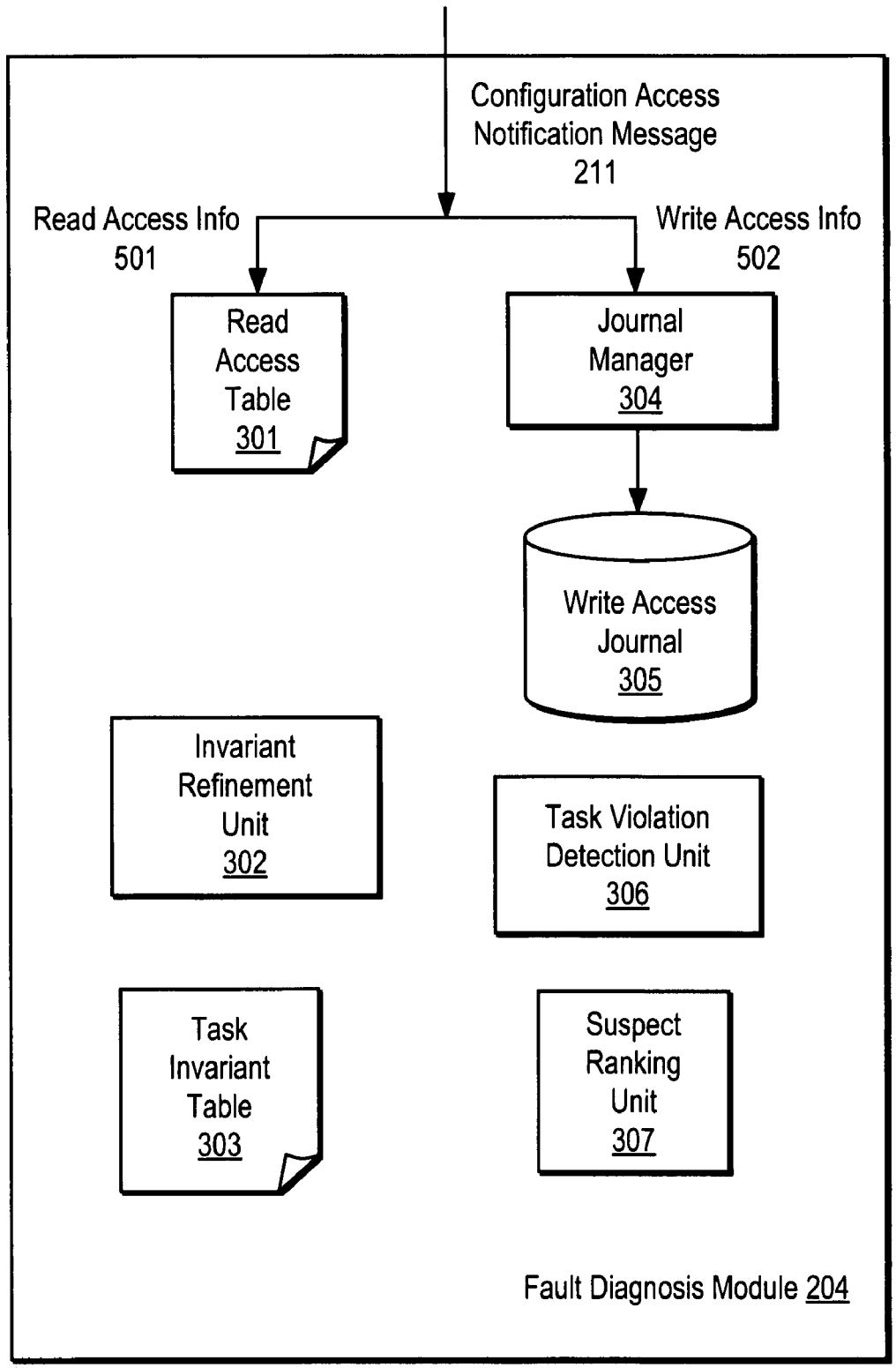
FIG. 5 illustrates the flow of data of one embodiment of a fault diagnosis module for the processing of a configuration access notification message.

FIG. 5 shows the flow of data inside one embodiment of fault diagnosis module 204 for the processing of a configuration access notification message 211. When message 211 is received through the CANI (e.g., CANI 201), read access information 501 contained in the message are used to update the entry for the task in read access table 301, while write access information 502 is redirected to write access manager 304 for updating write access journal 305.

Figure 6:
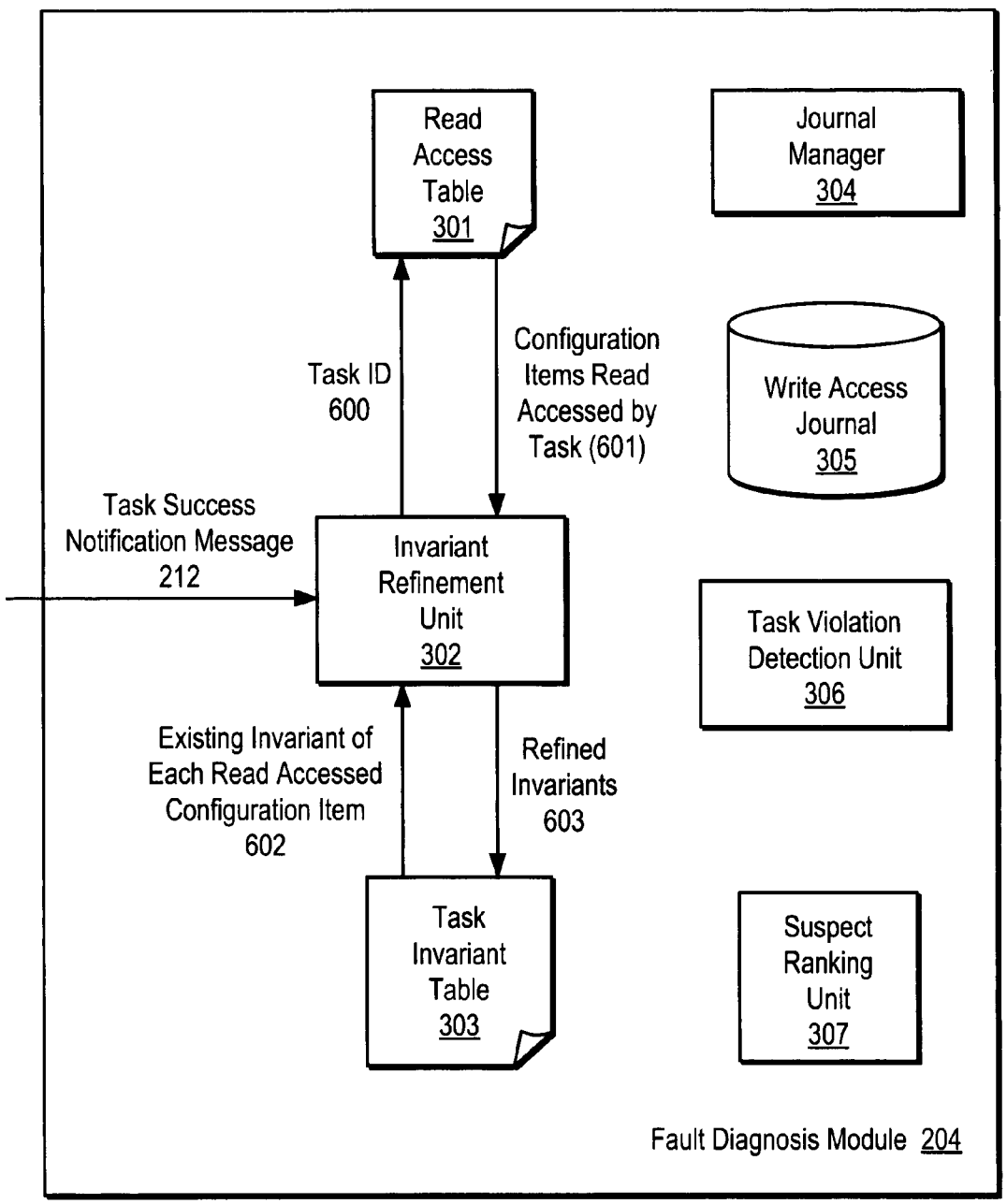
FIG. 6 illustrates the flow of data of one embodiment of a fault diagnosis module for the processing of a task success notification message.

FIG. 6 shows the flow of data inside one embodiment of fault diagnosis module 204 for the processing of a task success notification message 212. When message 212 is received through the TSNI (e.g., TSNI 202), invariant refinement unit 302 sends task ID 600 identifying the task and retrieves the list 601 of read accesses made by the task from read access table 301. Using list 601, for each configuration item that the task made a read access, invariant refinement unit 302 retrieves the corresponding invariant 602 (i.e., the invariant for the task and configuration item pair) from task invariant table 303 and checks if the value of the read access violates the invariants. If a violation is detected, invariant refinement unit 302 makes a copy of the invariant if it is shared with others and then refines the invariant with the value of the read access. Different types of invariants define refinement differently. For example, for a number invariant, if its upperBound is initially 2 and the new value is 3, then its refined upperBound is 3. For another example, for a string invariant: if its prefix is initially "abcd", and the new value is "abyz", then its refined prefix is "ab". Invariant refinement unit 302 sends refined invariants 603 to task invariant table 303.

Figure 7:
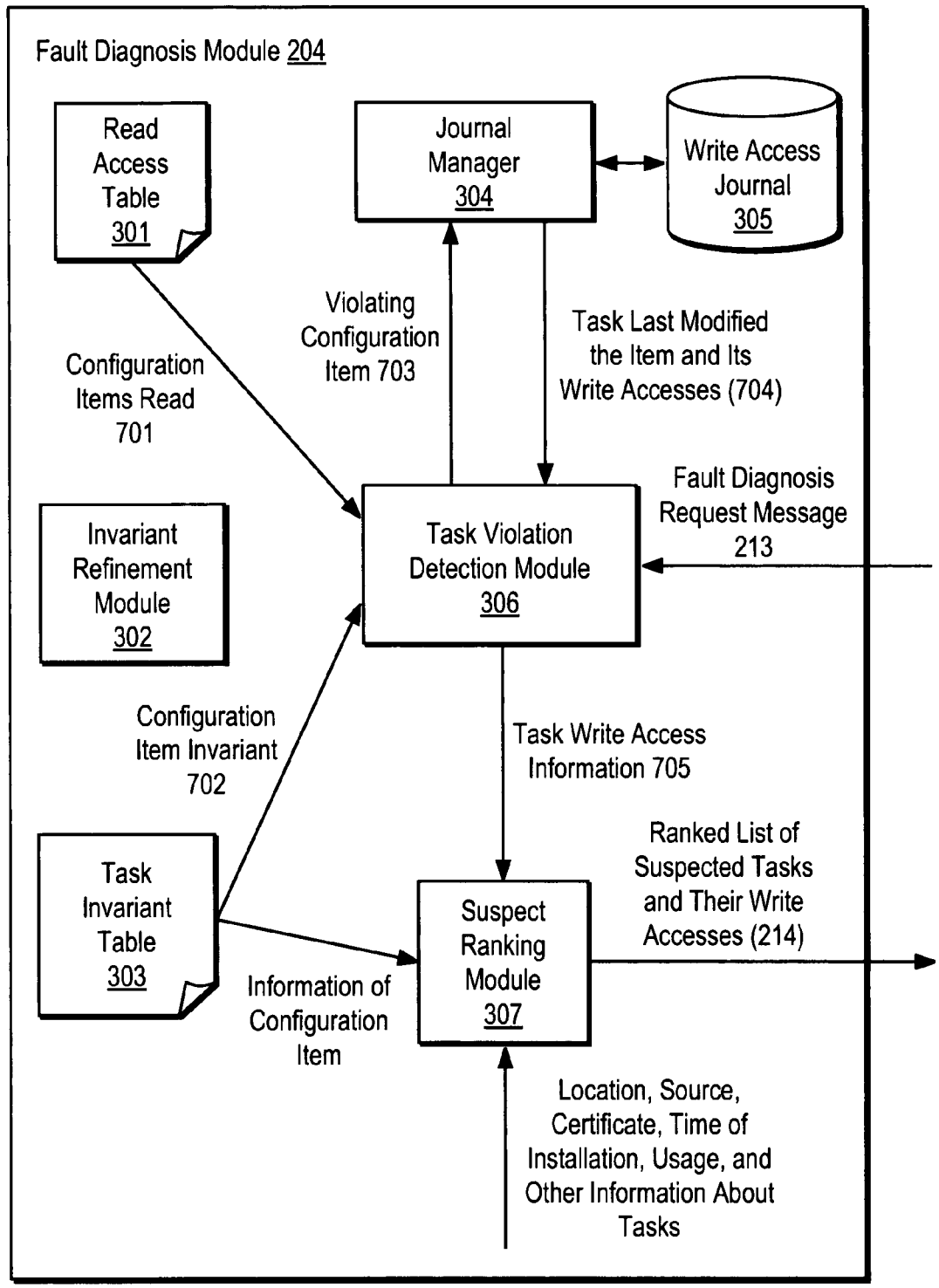
FIG. 7 illustrates the flow of data of one embodiment of a fault diagnosis module for the processing of fault diagnosis request message.

FIG. 7 shows the flow of data inside fault diagnosis module 204 for the processing of a fault diagnosis request message 213. When message 213 is received through the FDRI (e.g., FDRI 203), task violation detection unit 306 retrieves the list 701 of read accesses made by the task from read access table 301. Using list 701, for each configuration item that the task made a read access, task violation detection unit 306 obtains configuration item invariant 702 from task invariant task 303 and checks if the value of the read access violates the invariant for the task and configuration item pair. If a violation is detected, task violation detection unit 306 sends the configuration item 703 to write journal manager 304, which searches write access journal 305 for the task that last made write access to the configuration item, and returns a list 704 of all the write accesses to all configuration items made by the task since the failed task has last reported success. Task violation detection unit 306 collects all the violating tasks and their write accesses, and sends them as a list 705 to suspect ranking unit 307. Suspect ranking unit 307 uses list 705 and information of the configuration item from task invariant table 303 to rank the violating tasks. Therefore, suspect ranking unit 307 sends out a fault diagnosis result message 214 (with a ranked list of suspected tasks and their write accesses). Such ranked list of suspected tasks can be used, for example, by technical support personnel to first focus on suspected tasks on the top of the list during further diagnosis, thus reducing the cost in finding out the root cause of the problem. In such a case, the ranked list is displayed on a display screen of, for example, a device or computer system, or is printed by a hardcopy device (e.g., a printer). In one embodiment, an automated response is performed in response to the ranked list of suspected tasks, such as automatically restoring the value of the configuration item violated by the most suspected task, and optionally confirming with the user on whether that fixed the problem. If that doesn't solve the problem, then the restoration may be undone, and the next task on the list may be tried.

Ranking Suspect Tasks

Figure 8:
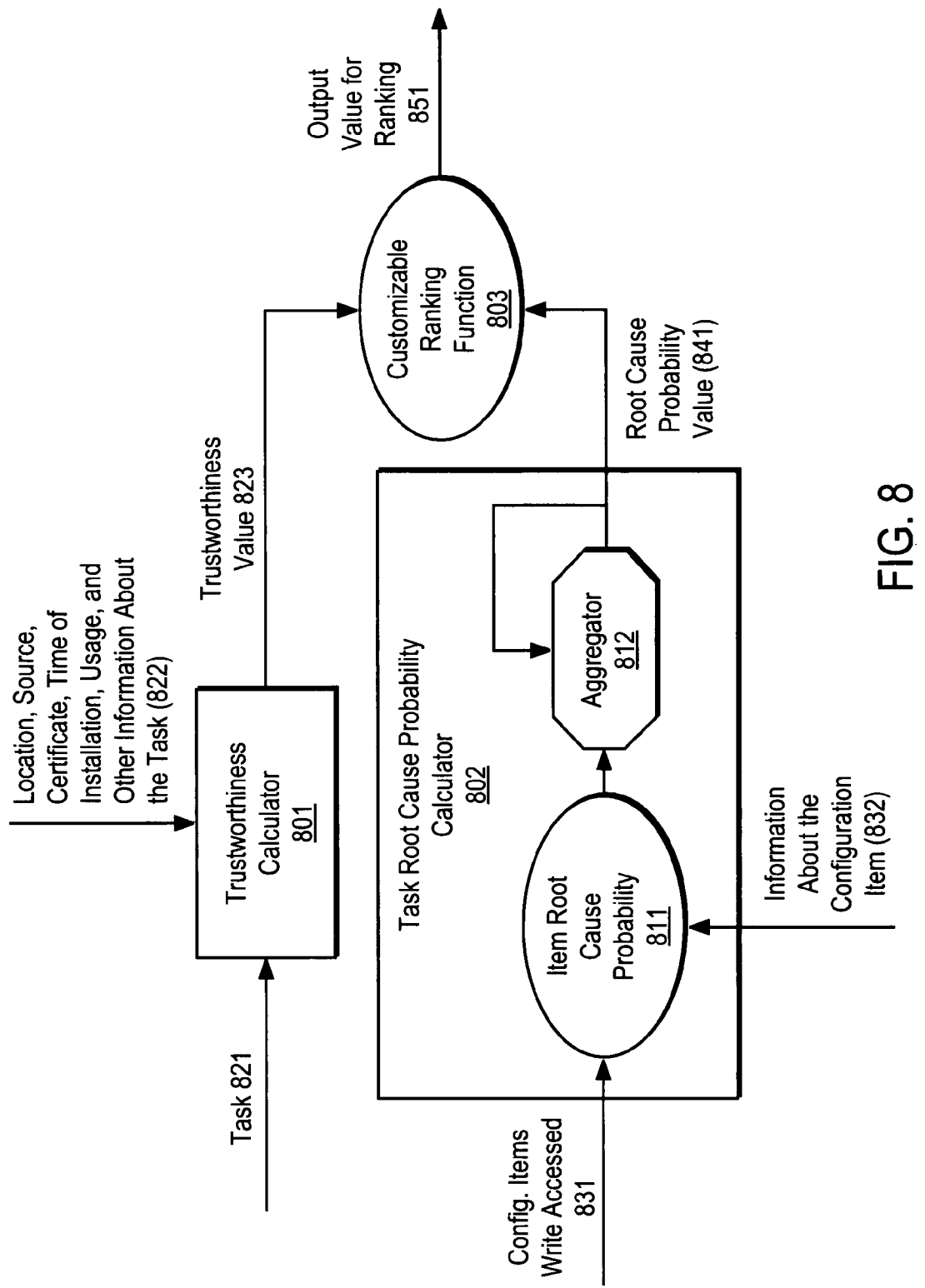
FIG. 8 is a flow diagram of one embodiment of a suspect ranking unit.

FIG. 8 is a flow diagram of one embodiment of a suspect ranking unit. Each of the components comprises processing logic that may comprise hardware (circuitry, dedicated logic, etc.), software (such as is run on a general purpose computer system or a dedicated machine), or a combination of both.

Referring to FIG. 8, suspect ranking unit 800 ranks each task based on its trustworthiness and its probability that violation of configuration invariants is the root cause for the failed task. In one embodiment, a customizable ranking function (F) is used for calculating the ranking of each task:

$$Ri=F(Ti,Pi)$$

where Ri is the ranking for task i, Ti is its quantified trustworthiness, and Pi is the probability that its violation of configuration invariants being the root cause of the failure. An instance of F is as follows:

$$F(Ti,Pi)=Ct/Ti+Cp*Pi$$

where Ct is the coefficient for trustworthiness, and Cp is the coefficient for root cause probability.

A trustworthiness value 823 for each task is computed by trustworthiness calculator 801. In one embodiment, calculator 801 takes following information (822) into consideration: a location of the binary executable or script of the task, a source of the binary executable or script of the task, a certificate, time of installation, and the number of users. A task started by binary executable or script residing in ROM has higher trustworthiness value. A task started by binary executable or script originated from, e.g., the wireless operator of the device or a trusted content provider has higher trustworthiness value, which those downloaded through Web browser has lower trustworthiness value. A task started by binary executable or script with certificate has higher trustworthiness value. A task started by binary executable or script installed earlier has higher trustworthiness value than those installed later. A task that has been executed more frequently has higher trustworthiness value.

Root cause probability is computed by root cause probability calculator 802. In one embodiment, or task Ti, which made write operations to a list of configuration items (CI(i, 1), CI(i,2), ... CI(i,n)) and violated invariants of these configuration items, calculator 802 first calculates the root cause probability 801 of each configuration item, then uses a customizable aggregation function 812 to calculate the aggregated probability (root causes probability value 841) of the task based on the root cause probability of each configuration item. In one embodiment, the aggregation function calculates the root cause probability of a task by summing up that of each configuration item. In another embodiment, the aggregation function only sums the N highest probability values of the configuration items.

In one embodiment, calculator 802 computes the root cause probability 811 of each configuration item with following information taken into consideration: number of other tasks accessing this configuration item (a larger number indicates lower probability); number of tasks succeeded after this configuration item was last write accessed (a larger number indicates lower probability); number of times current value was assigned to the configuration item (a larger number indicates lower probability, i.e., same value used by other tasks in the past); and number of write accesses to the configuration item made by the task being ranked over total number of write accesses (a higher ratio indicates higher probability).

At the end of its processing, suspect ranking unit 307 outputs the order list of suspected tasks, each with its ranking and write accesses it made to all configuration items.

An Example of a Computer System

Figure 9:
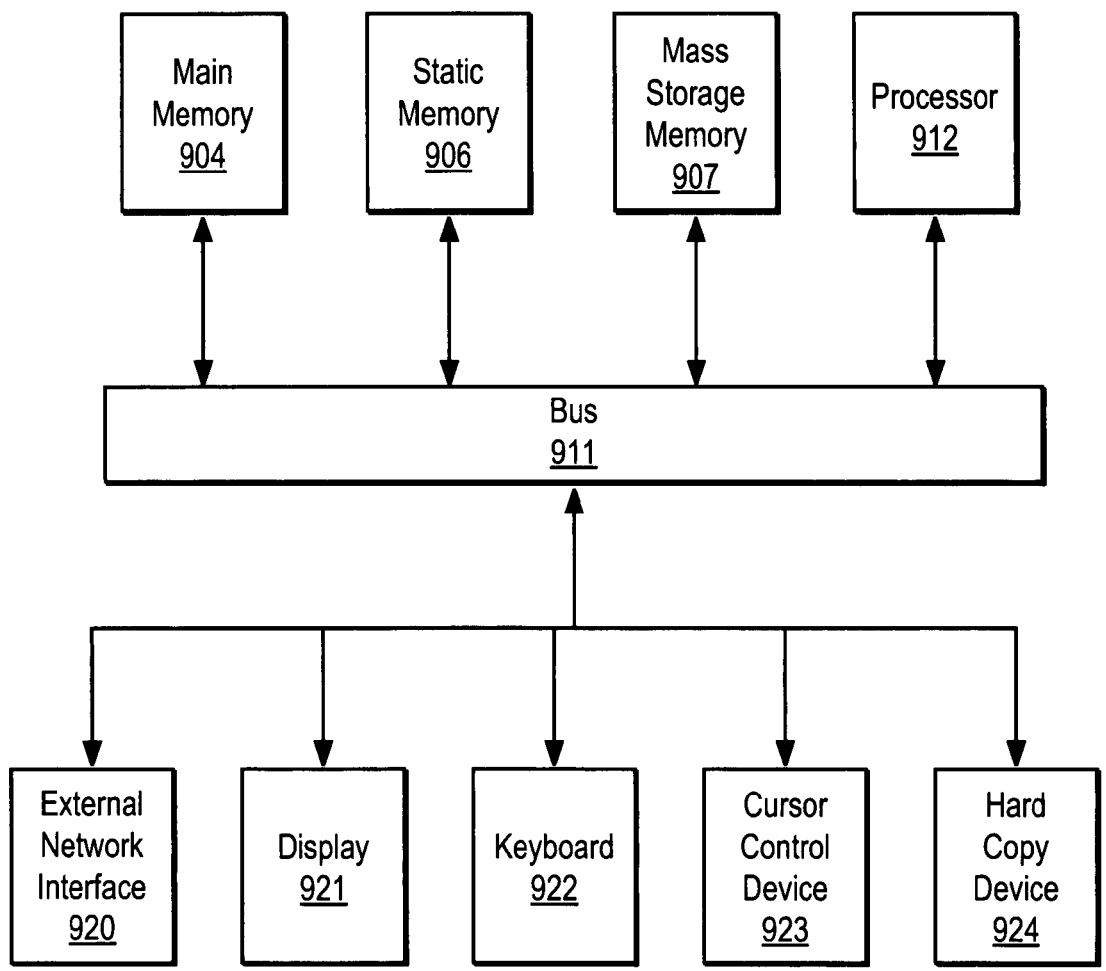
FIG. 9 is a block diagram of an exemplary computer system.

FIG. 9 is a block diagram of an exemplary computer system that may perform one or more of the operations described herein. For example, in one embodiment, all of components of FIG. 3 are included in such a computer system.

Referring to FIG. 9, computer system 900 may comprise an exemplary client or server computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, Alpha™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for marking information on a medium such as paper, film, or similar types of media. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

An Example of a Mobile Device

Figure 10:
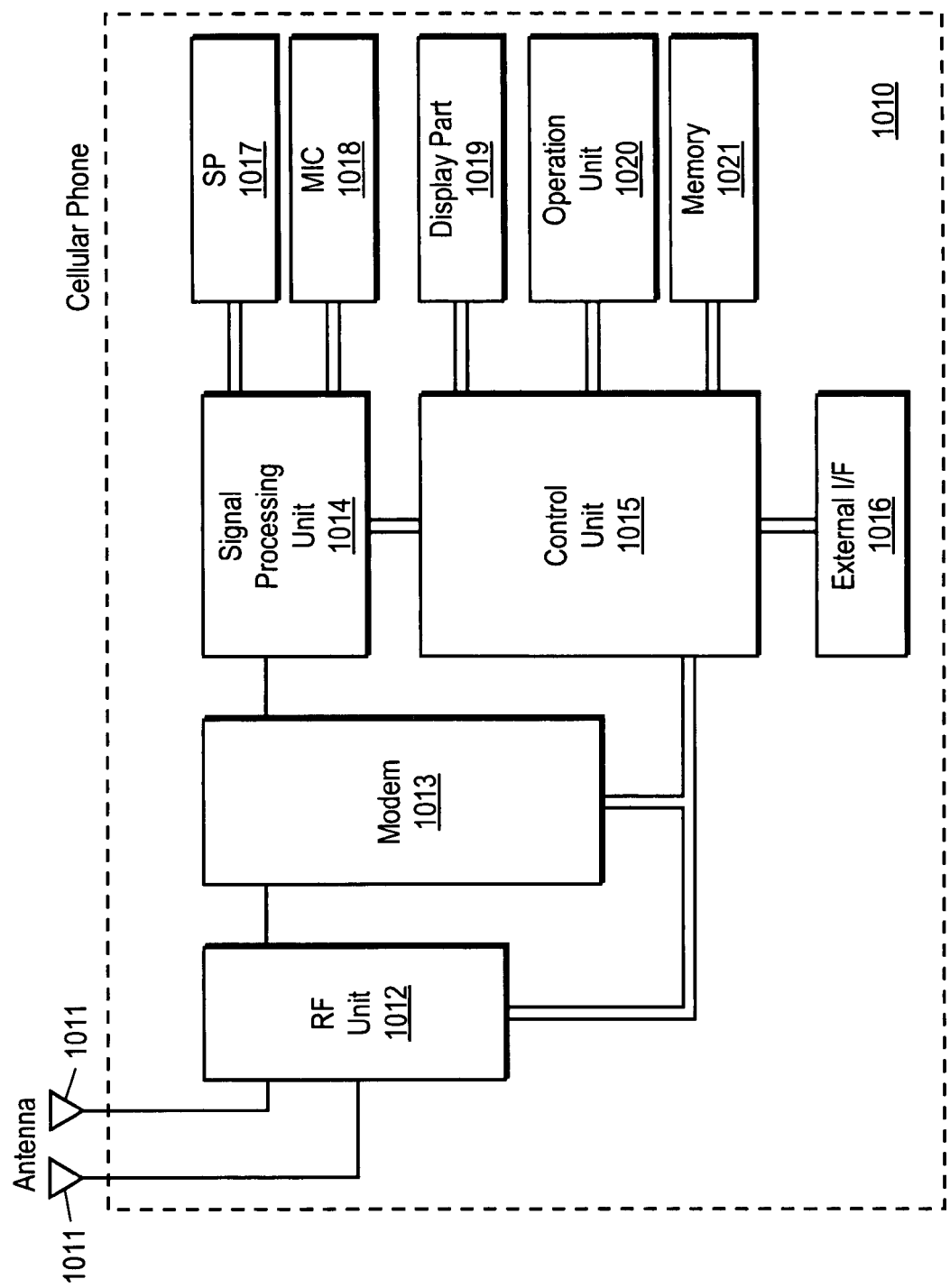
FIG. 10 is a block diagram of one embodiment of a mobile device.

FIG. 10 is a block diagram of one embodiment of a cellular phone that includes a transmitter and/or the receiver and includes components described above (e.g., components of FIG. 3) for fault diagnosis.

Referring to FIG. 10, the cellular phone 1010 includes an antenna 1011, a radio-frequency transceiver (an RF unit) 1012, a modem 1013, a signal processing unit 1014, a control unit 1015, an external interface unit (external I/F) 1016, a speaker (SP) 1017, a microphone (MIC) 1018, a display unit 1019, an operation unit 1020 and a memory 1021.

In one embodiment, the external terminal 1016 includes an external interface (external I/F), a CPU (Central Processing Unit), a display unit, a keyboard, a memory, a hard disk and a CD-ROM drive.

The CPU in cooperation with the memories of cellular phone 1010 (e.g., memory 1021, memory, and hard disk of the external I/F 1016) cooperate to perform the operations described above. In one embodiment, these memories include a linearly addressable memory to store SUPs and a non-linearly addressable memory to store non-SUPs.

Note that the transmitter and/or receiver may be included in a base station or other wireless devices (e.g., a wireless LAN).

The external I/F can be connected to a notebook, laptop, desktop or other computer. This can enable the cell phone to act as a wireless modem for the computer. The cell phone can be the computer's connection to the internet, WiFi and WiMAX, a local area network, a wide area network, a personal area network, Bluetooth.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
   detecting a violation to one or more dynamically constructed invariants for configuration; and
   diagnosing a misconfiguration based on use of a task-based ranking of misconfiguration suspect causes in which suspect causes of the misconfiguration are ranked based on information indicative of which entity made a change related to the one or more invariants for which a violation was detected, including ranking a plurality of tasks suspected of causing the misconfiguration based on trustworthiness indications and probabilities indicative of whether violation of configuration invariants by one or more tasks in the plurality of tasks is a cause for a failed task, where the probabilities are based on access to a configuration item by one or more tasks.

2. The method defined in claim 1 further comprising collecting the information by monitoring configuration accesses by each application or process.

3. The method defined in claim 1 wherein the information is indicative of which applications or processes made the change.

4. The method defined in claim 1 further comprising dynamically constructing the one or more invariants for configuration settings.

5. The method defined in claim 1 further comprising:
   generating a list of suspect tasks that made write operations to configuration items and violated invariants for each task that failed in the list of tasks;
   ranking tasks in the list of suspect tasks; and
   generating a list of ranked suspect tasks with information about write accesses to configuration items performed by tasks in the list of ranked suspect tasks.

6. A method comprising:
   detecting a violation to one or more dynamically constructed invariants for configuration; and
   diagnosing a misconfiguration based on use of a task-based ranking of misconfiguration suspect causes in which suspect causes of the misconfiguration are ranked based on information indicative of which entity made a change related to the one or more invariants for which a violation was detected, including
generating a list of suspect tasks that made write operations to configuration items and violated invariants for each task that failed in the list of tasks,
ranking tasks in the list of suspect tasks, and
generating a list of ranked suspect tasks with information about write accesses to configuration items performed by tasks in the list of ranked suspect tasks,
wherein the tasks are ranked based on trustworthiness indications and root cause probabilities indicative of whether their violation of configuration invariants is a root cause for the failed task, wherein a trustworthiness indication of a task is based on one or more of a group consisting of: a location of a binary executable or script of the task, a source of the binary executable or script, an indication of whether the binary executable or script has a certificate, and a number of times the binary executable or script has been executed.

7. A method comprising:
detecting a violation to one or more dynamically constructed invariants for configuration; and
diagnosing a misconfiguration based on use of a task-based ranking of misconfiguration suspect causes in which suspect causes of the misconfiguration are ranked based on information indicative of which entity made a change related to the one or more invariants for which a violation was detected, including
generating a list of suspect tasks that made write operations to configuration items and violated invariants for each task that failed in the list of tasks,
ranking tasks in the list of suspect tasks, and
generating a list of ranked suspect tasks with information about write accesses to configuration items performed by tasks in the list of ranked suspect tasks,
wherein the tasks are ranked based on trustworthiness indications and root cause probabilities indicative of whether their violation of configuration invariants is a root cause for the failed task,
wherein a root cause probability of a configuration item is based on one or more of a group consisting of: a number of other tasks accessing the configuration item, a number of tasks that occurred after the configuration item was last undergone a write access, a number of times a current value of the configuration item was assigned to the configuration item, and a number of write accesses to the configuration item made by the task being ranked over a total number of write accesses.

8. A system comprising:
a memory to store instructions;
a processor device, coupled to the memory, to execute the instructions;
a first interface to receive fault diagnosis requests that request that a fault diagnosis be made;
a fault diagnosis module implemented using the processor, responsive to fault diagnosis requests, to diagnose a misconfiguration based on use of a task-based ranking of misconfiguration suspect causes in which suspect causes of the misconfiguration are ranked based on information indicative of which entity made a change related to the one or more invariants for which a violation was detected, wherein the fault diagnosis module is operable to rank a plurality of tasks suspected of causing the misconfiguration based on trustworthiness indications and probabilities indicative of whether violation of configuration invariants by one or more tasks in the plurality of tasks is a cause for a failed task, where the probabilities are based on access to a configuration item by one or more tasks; and
a second interface to send a diagnosis result message containing information indicative of one or more tasks suspected of violating configuration invariants.

9. The system defined in claim 8 wherein the diagnosis result message contains information indicative of a likelihood that a task suspected of violating configuration invariants is a cause of the configuration invariant violation.

10. The system defined in claim 8 further comprising a third interface to receive configuration access notification messages that each includes information indicating an access made to configuration data to the system, and wherein the fault diagnosis module uses the access information when diagnosing the misconfiguration.

11. The system defined in claim 8 further comprising a fourth interface to receive task success notifications that each indicates information identifying a successful task, and wherein the fault diagnosis module uses the successful task information when diagnosing the misconfiguration.

12. A system comprising:
a memory to store instructions;
a processor device, coupled to the memory, to execute the instructions;
a first interface to receive fault diagnosis requests that request that a fault diagnosis be made;
a fault diagnosis module implemented using the processor, responsive to fault diagnosis requests, to diagnose a misconfiguration based on use of a task-based ranking of misconfiguration suspect causes in which suspect causes of the misconfiguration are ranked based on information indicative of which entity made a change related to the one or more invariants for which a violation was detected; and
a second interface to send a diagnosis result message containing information indicative of one or more tasks suspected of violating configuration invariants, wherein the fault diagnosis module comprises:
an invariant table having a plurality of entries, wherein entries of the plurality of entries being associated with distinct tasks and specify information to enable identification of a list of accesses to configuration items associated with each individual task and at least one invariant;
a task violation detection unit to determine a list of suspect tasks that made write operations to configuration items and violated invariants for each task that failed in the list of tasks; and
a suspect ranking unit to rank tasks in the list of suspect tasks obtained from the task violation unit and to generate a list of ranked suspect tasks with information about write accesses to configuration items performed by tasks in the list of ranked suspect tasks.

13. The system defined in claim 12 wherein the suspect ranking unit ranks tasks based on trustworthiness indications and root cause probabilities indicative of whether their violation of configuration invariants is a root cause for the failed task.

14. The system defined in claim 13 wherein a trustworthiness indication of a task is based on one or more of a group consisting of: a location of a binary executable or script of the task, a source of the binary executable or script, an indication of whether the binary executable or script has a certificate, and a number of times the binary executable or script has been executed.

15. The system defined in claim 13 wherein a root cause probability of a configuration item is based on one or more of a group consisting of: a number of other tasks accessing the configuration item, a number of tasks that occurred after the configuration item was last undergone a write access, a number of times a current value of the configuration item was assigned to the configuration item, and a number of write accesses to the configuration item made by the task being ranked over a total number of write accesses.

16. The system defined in claim 12 wherein the information to enable identification of a list of accesses to configuration items associated with each individual task and at least one invariant comprises a pointer to an invariant.

17. The system defined in claim 12 wherein the fault diagnosis module further comprises an invariant refinement unit to redefine an invariant for a configuration item accessed by a task with a new value.

18. The system defined in claim 17 wherein the invariant refinement unit checks if the new value violates the invariant and redefines the invariant with the new value taken into consideration if the new value violates the invariant.

19. The system defined in claim 17 wherein the fault diagnosis module further comprises:
a read access storage to store information corresponding to tasks that have read configuration items, including a value of each configuration item when each read access occurred; and
a write access storage to store write accesses to configuration items that are made by tasks.

20. The system defined in claim 19 further comprising a manager, and wherein:
the task violation detection unit obtains a list of read accesses made by a task from the read access storage and, for each configuration item that the task made a read access, checks whether the value of the read access violates an invariant for the task and configuration item pair,
the manager receives information identifying the configuration item from the task violation detection unit, searches the write access storage for the task that made the more recent write access to the configuration item, and returns, to the task violation detection unit, a list of all write accesses to all configuration items made by the task since a failed task has last reported success,
the task violation detection unit collecting tasks from the manager to create the list of suspect tasks, and
the suspect ranking unit ranks violating tasks in the list of suspect tasks and sends a fault diagnosis result message indicating violating tasks.

21. The system defined in claim 19 further comprising:
a third interface to receive configuration access notification messages that each includes information indicating an access made to configuration data to the system, and wherein the fault diagnosis module uses the access information when diagnosing the misconfiguration, wherein the read access table is updated based on read access information in the configuration access notification messages; and
a fourth interface to receive task success notifications that each indicates information identifying a successful task, and wherein the fault diagnosis module uses the successful task information when diagnosing the misconfiguration, wherein the write access storage is updated based on write access information in the configuration access notification messages.

22. An article of manufacture having one or more computer storage readable media storing instructions therein which, when executed by a system, cause the system to perform a method comprising:
detecting a violation to one or more dynamically constructed invariants for configuration; and
diagnosing a misconfiguration based on use of a task-based ranking of misconfiguration suspect causes in which suspect causes of the misconfiguration are ranked based on information indicative of which application or process made a change related to the one or more invariants for which a violation was detected, including ranking a plurality of tasks suspected of causing the misconfiguration based on trustworthiness indications and probabilities indicative of whether violation of configuration invariants by one or more tasks in the plurality of tasks is a cause for a failed task, where the probabilities are based on access to a configuration item by one or more tasks.

23. The article of manufacture defined in claim 22 further comprising collecting the information by monitoring configuration accesses by each application.

24. The article of manufacture defined in claim 22 wherein the method further comprises:
generating a list of suspect tasks that made write operations to configuration items and violated invariants for each task that failed in the list of tasks;
ranking tasks in the list of suspect tasks; and
generating a list of ranked suspect tasks with information about write accesses to configuration items performed by tasks in the list of ranked suspect tasks.

* * * * *